| United States Patent [19] | [11] 3,961,154 |
|---|---|
| Ericsson | [45] June 1, 1976 |

[54] DIRECT CURRENT POWER SUPPLY FOR MANUAL ARC WELDING

[75] Inventor: Rolf Ericsson, Laxa, Sweden

[73] Assignee: Elektriska Svetsningsaktiebolaget, Goteburg, Sweden

[22] Filed: Oct. 16, 1974

[21] Appl. No.: 515,415

Related U.S. Application Data

[63] Continuation of Ser. No. 352,446, April 18, 1973, abandoned.

[30] Foreign Application Priority Data

Apr. 18, 1972 Sweden............................ 4964/72

[52] U.S. Cl. ...................... 219/135; 219/131 WR
[51] Int. Cl.$^2$............................................. B23K 9/10
[58] Field of Search ........ 219/131 R, 135, 131 WR, 219/131 F; 321/19; 323/89 A

[56] References Cited
UNITED STATES PATENTS

| 3,597,580 | 9/1971 | Stearns et al. .................... 219/135 |
| 3,728,516 | 4/1973 | Daspit.............................. 219/135 |

*Primary Examiner*—Arthur T. Grimley
*Assistant Examiner*—Clifford C. Shaw
*Attorney, Agent, or Firm*—Cameron, Kerkam, Sutton, Stowell & Stowell

[57] ABSTRACT

A direct current power supply for manual arc welding having a steeply drooping, adjustable characteristic, comprising a polyphase transformer and a polyphase rectifier system including triggered rectifier means and a control system therefor providing both welding current and welding voltage feed-back. The welding current feed-back is substantially fixed. The welding voltage feed-back is adjustable for adjustment of the slope of the characteristic.

3 Claims, 14 Drawing Figures

DIRECT CURRENT POWER SUPPLY FOR MANUAL ARC WELDING

This is a continuation of application Ser. No. 352,446, filed Apr. 18, 1973, now abandoned.

BACKGROUND OF THE INVENTION

This invention relates to a direct current power supply for manual arc welding a steeply drooping, adjustable characteristic. In this context, the expression "steeply drooping" should be understood to indicate that the short circuit current exceeds the arc current by not more than 50%. More particularly, the invention relates to a power supply of the type comprising a polyphase transformer, a polyphase rectifier system connected to the secondary of said polyphase transformer, said rectifier system comprising a set of triggered rectifier valves connected one in series with each secondary phase circuit of the polyphase transformer, a pair of welding current conductors connected to the output of said polyphase rectifier system, means for controlling the firing angle of the triggered rectifier system in response to a direct current control signal, and signal generating means for producing said direct current control signal comprising
  means for producing an adjustable direct current reference signal,
  means including a welding current sensing means for producing a welding current feed-back direct current signal, and,
  summing means for combining said reference signal and said welding current feed-back signal into a compound signal constituting the control signal aforementioned, said feedback signal being supplied to said summing means in opposing relationship to said reference signal.

In a welding power supply of this kind described in the U.S. Pat. No. 3,530,359, the adjustable D.C. reference signal is obtained by the combining of two component signals, both of which are individually adjustable. More particularly, one adjusting member is provided for the first component, while two adjusting members independent of each other and of said first-mentioned adjusting member are provided for the second component. One of said two last-mentioned adjusting members also serves to control the slope of the characteristic of the power supply through adjustment of the factor of proportionality between the welding current feed-back signal and the welding current. Consequently, the proper adjustment of the apparatus involves the manipulation of three independent controls, which is apt to confuse the welder. Also, the welding current delivered by a power supply of this kind varies strongly with the line voltage. The disturbing action of line voltage fluctuations increases with the forward slope of the characteristic. To minimize the disturbing action of line voltage fluctuations the slope control has to be set at as steep a slope as possible, that is, a slope approaching the vertical as nearly as possible. On the other hand, it is a well-known fact that, in welding with coated electrodes, the short circuit current must exceed the arc current by not too small an amount in order to ensure an orderly metal transfer from the electrode to the workpiece and to prevent "stubbing" and other undesirable effects. With the control system referred to it is, therefore, not possible to combine good welding characteristics with the desired insensitivity to line voltage fluctuations.

SUMMARY OF THE INVENTION

The present invention provides an improved arc welding power supply of the type above specified which does not exhibit the disadvantages of the control system previously employed. In particular, the invention provides a control system in which the action of line voltage fluctuations upon the welding current can be substantially suppressed or kept within acceptable limits and in which the slope of the power supply characteristic can be adjusted as desired substantially without any resulting increase of the sensitivity to line voltage fluctuations.

According to one aspect of the invention, the signal generating means for producing the direct current control signal supplied to the means for controlling the firing angle the triggered rectifier system comprises means for producing an adjustable direct current reference signal,
  means including a welding current sensing means for producing a welding current feed-back direct current signal bearing a substantially fixed proportion to the welding current,
  means including a welding voltage sensing means for producing a welding voltage feed-back direct current signal proportional to the welding voltage,
  summing means for combining said reference signal, said welding current feed-back signal and said welding voltage feed-back signal into a compound signal constituting the control signal aforementioned, both of said feed-back signals being supplied to said summing means in opposing relationship to said reference signal,
  said means for producing a welding voltage feed-back signal including means for adjustment of the slope of the power supply characteristic through adjustment of the factor of proportionality between said voltage feed-fack signal and the welding voltage.

The invention also includes a control system for a welding power supply of the type stated in which the required insensitivity to line voltage fluctuations is secured by the use of a sufficiently large welding current feed-back factor and in which adjustable feed-back of the welding voltage is provided in order to allow the required adjustment of the slope of the welding supply characteristic. The term "welding current feed-back factor" means the quantity $\Delta V / \Delta I$, in which $\Delta I$ is the magnitude of a change of the current through the welding current sensing means and $\Delta V$ is the change of the output voltage of the rectifier system resulting from said change of current. The determination of said quantity must be carried out under the following conditions: The control loop must be open (no feed-back); the transformer must be connected to the normal line voltage; the rectifier must be adjusted to provide an output voltage within the arc voltage range. According to the invention, the welding current feed-back factor thus determined should not be below 1.5 volts/ampere, preferably not below 2.5 volts/ampere. Feed-back factors exceeding 5 volts/ampere are best avoided, as they may cause instability of the control system.

Further advantages and benefits of the present invention will become apparent from the following description of embodiments of the invention, taken in conjunction with the accompanying drawings.

DESCRIPTION OF THE EMBODIMENTS

Figures 1, 1A, 2:
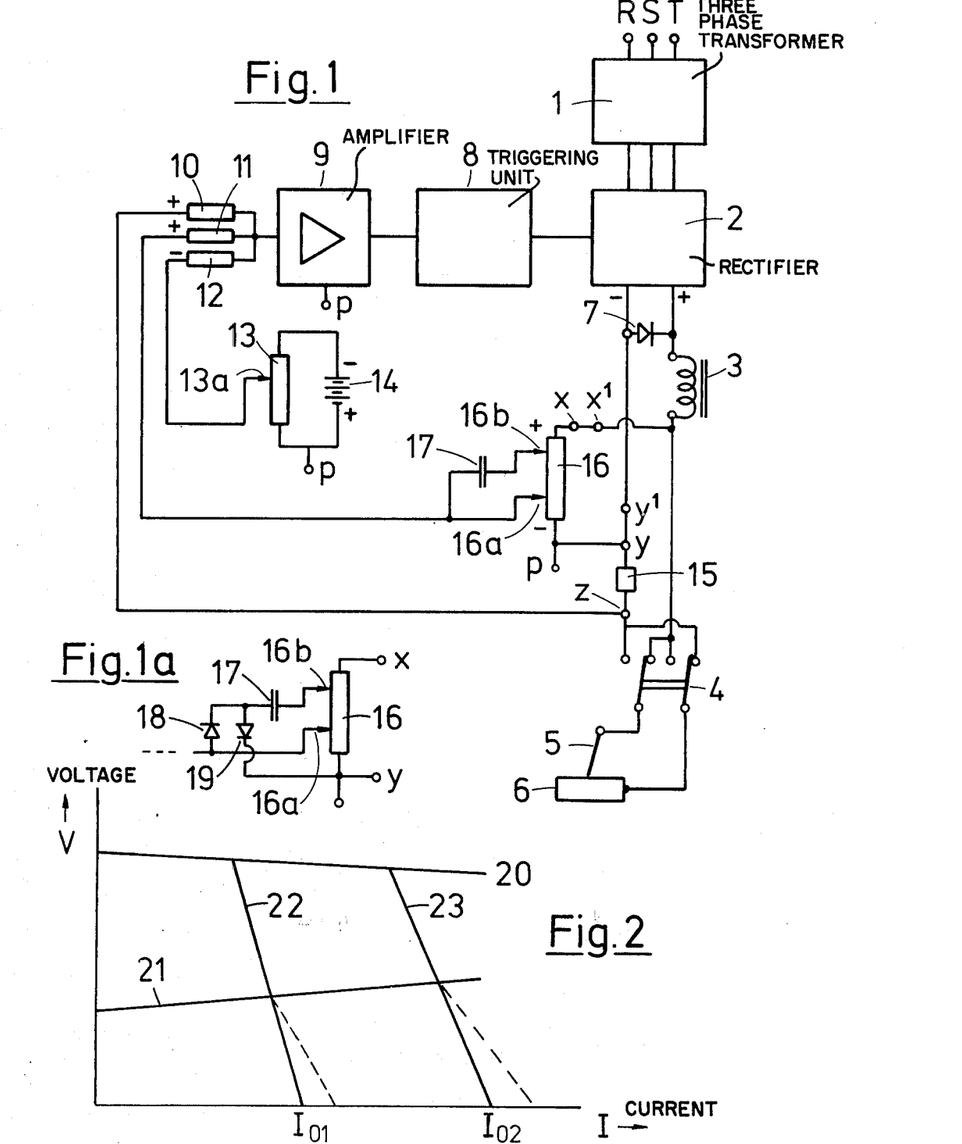
FIG. 1 is a circuit diagram of a first embodiment of a welding power supply according to the invention.
FIG. 1a shows a modified form of part of the circuit of FIG. 1.
FIG. 2 is a voltage-current diagram illustrating the mode of working of the circuit of FIG. 1.

The welding power supply of FIG. 1 comprises a three-phase transformer 1 having input terminals R, S, T, connected to a three-phase power line. The secondary of said transformer is connected to a rectifier 2 provided with triggered rectifier valves. The transformer 1 has a low magnetic leakage and may be a power transformer of the usual type in which the windings are carried by a common, three-legged core. A welding circuit connected to the output of the rectifier contains a series inductor 3 and a pole-changing switch 4 by which any desired polarity of the welding electrode 5 with respect to the workpiece 6 can be obtained. A freewheel diode 7 is connected between the end of the inductor connected to the rectifier and the other welding current conductor. The rectifier 2 is controlled by a triggering unit 8 emitting triggering impulses synchronized with the line voltage, the phase angles of said triggering impulses being controlled in response to a control signal supplied to the triggering unit by amplifier means 9. The input lead of said amplifier means 9 is connected to a summing circuit comprising three resistors 10, 11, 12. The resistor 12 is connected to an adjustable tap 13a of a potentiometer 13 connected to a source of constant voltage 14. Thus, the resistor 12 conducts a constant current the magnitude of which is adjustable by means of the tap 13a. The resistor 10 is connected to a welding current sensing means comprising a resistor 15 of small magnitude connected in series with one of the welding current conductors. The resistor 11 is connected to an adjustable tap 16a of a potentiometer 16 connected between the welding current conductors. The currents flowing through resistors 10, 11 are proportional to the welding current and the welding voltage, respectively. The points marked "P" in the diagram are galvanically connected with each other by conductor means not shown and define the zero potential of the control signal generating circuit. The input signal supplied by the summing circuit 10–12 to the amplifier means 9 is proportional to the algebraic sum of the currents flowing through the resistors. The polarities are arranged so as to make the currents in resistors 10, 11 oppose the current in the resistor 12. Consequently, the input signal of the amplifier means 9 as well as the output voltage of said amplifier means are equal to the difference between a constant term and the sum of two terms varying respectively with the welding current and the welding voltage. The resulting control signal is supplied to the triggering unit 8 and determines the phase angle of the triggering pulses supplied by said triggering units to the rectifier 2. The described feed-back of the welding current and the welding voltage impart to the rectifier a steeply drooping characteristic determined by the setting of the potentiometers 13 and 16. More particularly, the setting of the potentiometer 13 determines the magnitude of the short circuit current, while the setting of the tap 16a of the potentiometer 16 determines the droop, or angle of inclination, of the characteristic.

According to the invention, the welding current feed-back factor should amount to at least 1.5 volts/ampere in order to prevent variations of the line voltage supplied to terminals R, S, T from causing inconveniently large variations of the welding current. A determination of the welding current feed-back factor can be carried out in the following way. The connections between the points $x$, $x^1$ and between the points $y$ and $y^1$ are broken. An independent source of D.C. voltage is connected between the points $x$ and $y$, its positive terminal being connected to the point $x$. An independent source of direct current is connected between the points $y$ and $z$, its positive terminal being connected to the point $z$. The output voltages of one or both of said independent D.C. sources are adjusted so as to make the rectifier 2 supply an output voltage within the range of normal welding voltages. The D.C. source connected between points $y$ and $z$ is now adjusted so as to alter the current flowing through the resistor 15 by a certain amounts $\Delta I$, for instance 1 ampere. The resulting change $\Delta V$ (in volts) of the output voltage of the rectifier 2 is determined. The rate $\Delta V / \Delta I$ is the current feed-back factor.

Theoretically, the determination of the current feed-back factor should be carried out with the rectifier connected to a load resistor adjusted so as to make the rectifier deliver a current of the same magnitude as the arc current corresponding to the output voltage of the rectifier. However, the error caused by carrying out the determination under no-load conditions, as above described, is negligible.

It will be realized that the welding current feed-back factor is a function of the resistance of the resistor 15, the resistance of the resistor 10, the amplification of the amplifier means 9 and the amplification of the system provided by the rectifier 2 itself and its triggering unit 8. The amplification of said lastmentioned system and usually also the resistance of the resistor 15 being constant factors, the resistance of the resistor 10 and/or the amplification of the amplifier means 9 have to be adjusted so as to provide the desired welding current feed-back factor.

In addition to the tap 16a, the potentiometer 16 has an adjustable tap 16b connected to the tap 16a by a capacitor 17. The tap 16b is connected to a point of the potentiometer 16 having a higher potential than the tap 16a. The capacitor 17 transmits no current as long as the welding voltage is constant and therefore does not modify the static characteristic. When there occurs a change of the voltage between the welding current conductors, a charging or discharging current flows through the capacitor 17, resulting in a transient increase of the change of the current through the resistor 11. For the duration of said charging or discharging current through the capacitor 17, the control circuit therefore adjusts the characteristic to a slope less steep than the static one. When a short circuit occurs between the electrode and the workpiece, the control circuit thus provides a transient short circuit current exceeding the one determined by the static characteristic.

On termination of the short circuit condition, the circuit described transiently adjusts the power supply characteristic to provide an arc current lower than the one determined by the static characteristic. The modified circuit shown in FIG. 1a avoids this effect, which is not desirable and may be harmful. In the circuit of FIG. 1a, the capacitor 17 is connected to the tap 16a through a rectifier valve 18 poled so as to allow discharge only of the capacitor. To allow charging of the capacitor, a second rectifier valve 19 connects the capacitor to the zero potential end of the potentiometer 16. By this means the charging current through the capacitor 17 occurring on increase of the voltage between the welding current conductor is prevented from causing any change of the current through the resistor 11.

FIG. 2 illustrates the action of the circuit. The line 20 is the characteristic of the power supply under the assumption that the rectifier valves are conducting during the complete A.C. period. The line 21 is a normal or schematized characteristic of the welding arc. The lines 22 and 23 are two static characteristics of the power supply providing the short circuit current $I_{o1}$ and $I_{o2}$ (corresponding to two different settings of the potentiometer tap 13a). The characteristics are represented as having different slopes (corresponding to two different settings of the tap 16a). The dotted lines illustrate the transient reduction of the slope angle and resulting transient increase of the short circuit current produced by the action of the capacitor 17 in FIG. 1 or 1a.

Figure 3:
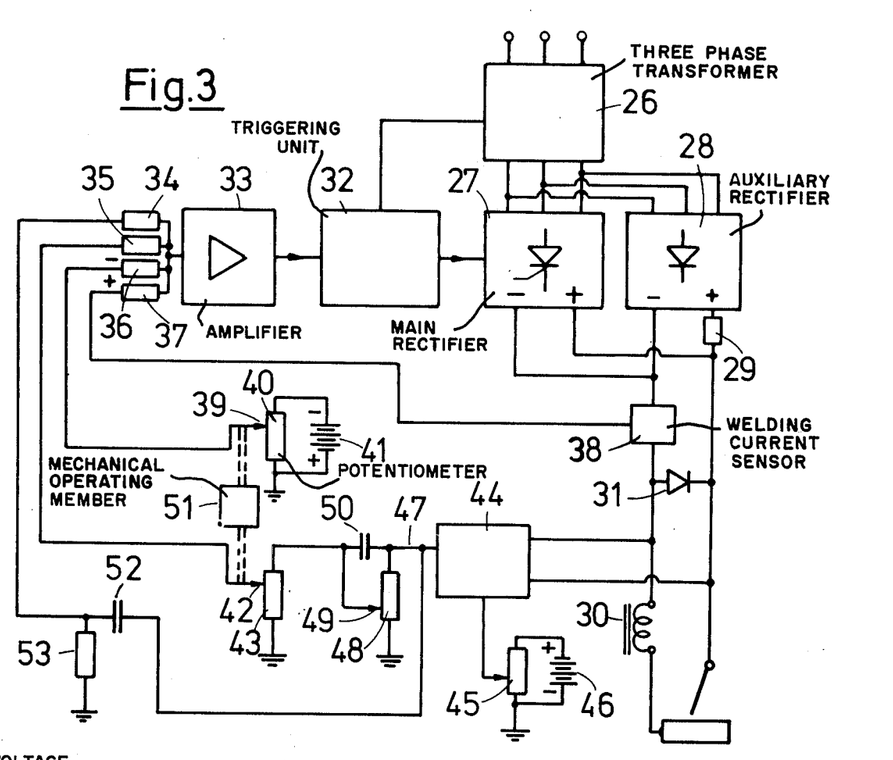
FIG. 3 is a circuit diagram of a second embodiment of a welding power supply according to the invention.

The embodiment of the invention schematically shown in FIG. 3 comprises a three-phase transformer 26 the secondary of which is connected to a main rectifier 27 and an auxiliary rectifier 28. The main rectifier is provided with triggered rectifier valves to allow the control of the output current. The auxiliary rectifier 28 comprises plain (non-controlled) rectifier valves only. Both of the rectifiers are arranged to feed one and the same welding circuit. The auxiliary rectifier is connected in series with a resistor 29 limiting the short circuit current of the auxiliary rectifier to a low value. The welding circuit contains a series inductor 30. A free-wheel diode 31 is connected between the conductor connecting the inductor with a power supply and the other welding current conductor. The rectifier 27 is controlled by a triggering unit 32 to which a control signal is supplied by an amplifier device 33. The input end of the amplifier device 33 is connected to a summing circuit comprising four resistors 34, 35, 36, 37. The resistor 37 is connected to a welding current sensing means 38 provided in one of the welding current conductors, resulting in a flow of current through the resistor 37 proportional to the welding current. The resistor 36 is connected to an adjustable tap 39 of a potentiometer 40 connected to a source of constant D.C. voltage 41. The resistor 35 is connected to an adjustable tap 42 of a potentiometer 43 supplied by a comparing circuit 44 with a voltage varying with the welding voltage. The welding voltage between the welding current conductors and a constant voltage supplied by a potentiometer 45 connected to a source of constant voltage 46 are fed separately into the comparing circuit 44, which is arranged to supply to a conductor 47 a voltage proportional to the difference between the welding voltage and a constant voltage $V_r$, said voltage $V_r$ being equal to or bearing a predetermined proportion to the voltage supplied by the potentiometer 45. The output voltage of the conductor 47 is supplied to a potentiometer 48 the tap 49 of which is connected to the potentiometer 43 above referred to. A capacitor 50 connected between the conductor 47 and the tap 49 of the potentiometer 48 has a function identical with the one of the capacitor 17 of the circuit of FIG. 1.

The input voltage or control voltage provided by the summing circuit 35, 36, 37 contains the following (static) components:

a. A constant component adjustable by means of the potentiometer 40, b. a constant component adjustable by means of the potentiometers 48 and 43, said component acting in the same sense as the component $a$, c. a component varying with the welding voltage and opposed to the component $a$, the factor of proportionality between said component and the welding voltage being adjusted by means of the potentiometers 48 and 43, d. a component opposed to the component $a$ and varying with the welding current (supplied by the current sensing means 38).

The sum of the adjustable components $a$ and $b$ constitutes the constant reference component of the control signal and corresponds to the reference signal supplied in the circuit of FIG. 1 by the potentiometer 13 and the resistor 12. The control system operates in the same way as the circuit of FIG. 1. The system according to FIG. 3 provides, however, a certain practical advantage over the system of FIG. 1. In the system of FIG. 1, the setting of the reference component of the control signal is carried out by means of the potentiometer tap 13a. Displacing of said tap results in a displacement of the characteristic parallelly to itself. The slope of the characteristic is adjusted by means of the potentiometer tap 16a. A change of the position of said tap produces a rotation of the characteristic about the intersection of the characteristic and the current axis. This angular displacement of the characteristic results in a displacement of the operation point (that is, the intersection of the characteristic of the power supply and the arc characteristic). For instance, adjustment of the characteristic towards lower slope angles displaces the point of operation towards lower currents. As this displacement is not always negligible, the position of the tap 13a cannot be relied on to indicate the precise current setting of the power supply. In the circuit of FIG. 3, displacement of the tap 39 of the potentiometer 40 shifts the power supply characteristic parallelly to itself, while displacement of the tap 49 of the potentiometer 48 rotates the characteristic about its intersection S (FIG. 4) with the line $V = V_r$ parallel with the current axis, $V_r$ being equal to (or proportional to) the constant voltage supplied in opposition to the welding voltage in the comparing circuit 44.

Figure 4:
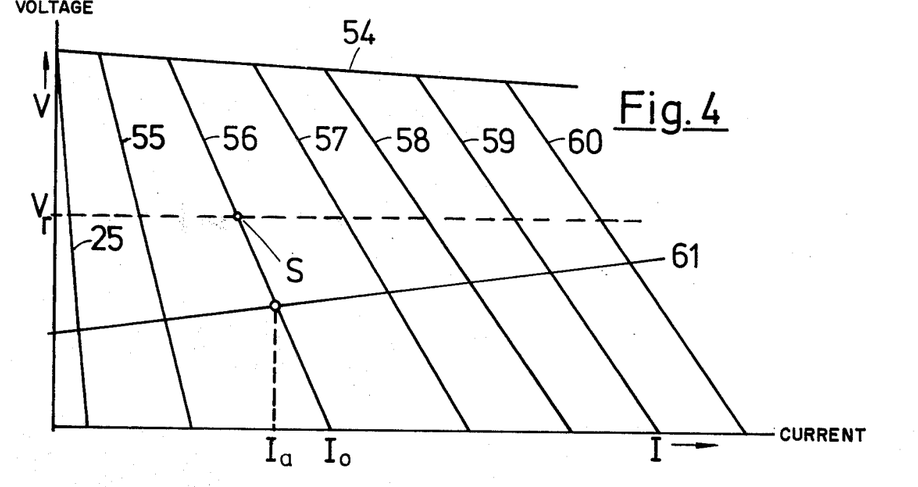
FIG. 4 is a voltage-current diagram illustrating the mode of working of the circuit of FIG. 3.

FIG. 4 shows, in addition to the characteristic 54 of the rectifier when fully conducting, a number of controlled characteristics 55–60. The dotted line indicates the constant reference voltage $V_r$. It follows from the above explanation that the change of arc current attending a change of the slope of the characteristic at a given setting of the potentiometer tap 39 (resulting in a rotation of the characteristic about the point S) is proportional to the distance between the point S and the arc characteristic 61. $V_r$ may for instance be about equal to or only a little larger than the largest arc voltage which can occur. In this case, the changes of the arc current $I_a$ caused by changes of the slope setting are small enough to allow the provision of a realistic current graduation on the potentiometer 40. Still better precision can be obtained by using a reference voltage $V_r$ equal to an arc voltage at the middle of the arc characteristic.

It has been established that a certain relation between the magnitude of the arc current and the slope of the characteristic is required for optimum welding properties. More particularly, the relative increase of the static short circuit current over the arc current, or $100 \cdot I_o - I_a/I_a$ should be approximately constant at least within a medium range of currents. At high welding currents, a somewhat smaller relative increase of the short circuit current may be allowable and suitable. The characteristics of FIG. 4 illustrate these maxims. The characteristics 55 to 58 have slope angles which decrease with increasing current settings, while the characteristics 59, 60 at the upper end of the arc current range have the same slope as the characteristic 58. In some cases it may even be advisable to provide for a decrease of the slope with increasing currents at the upper end of the current range, in order to avoid overload of the rectifier valves. At the lower end of the current range, a higher relative increase of the short circuit current than the one used for medium current settings is allowable and sometimes useful. This is particularly true for arc currents lower than 50 amperes. The relative increase of the short circuit current must, however, never exceed 50% of the arc current.

Preferably means linking the setting of the potentiometers 40 and 43 are provided in order to establish a predetermined relation between the welding current setting and the slope of the characteristic. In FIG. 3, said link means are represented as a common mechanical operating member 51 for the potentiometer taps 39 and 42, the characteristics of the potentiometers being assumed to be adapted to each other in such a way as to provide the desired relation. Said linking means also ensures that there will be a definite relation between the current and the setting of the adjustable tap 39 (and the operating member 51) irrespectively of the choice of the constant voltage $V_r$.

The transient control signal component supplied to the amplifier device through the capacitor 50 is reduced by the potentiometer 43 in the same proportion as the static component. At the lower end of the current range, the transient control signal thus produced and the resulting transient current increase on short circuit is too low. To provide a contributory transient control voltage, a resistor 34 forming part of the summing circuit at the input of the amplifier device 33 is connected to the output conductor 47 of the comparing circuit 44 through a circuit comprising a series capacitor 52 and a resistor 53.

At low welding currents, the current supplied by the main rectifier is composed of comparatively brief pulses separated by currentless intervals. The low current supplied by the auxiliary rectifier 28 in series with the resistor 29 bridges said currentless intervals, resulting in an improved arc stability at low currents. In the embodiment of FIG. 3, the auxiliary rectifier is connected to the same transformer winding as the main rectifier 27. It is, however, equally possible to connect the auxiliary rectifier to a separate winding of the transformer 26 or to a separate transformer, preferably with a higher secondary voltage than the winding feeding the main rectifier.

When the welding current feed-back factor of the control system of FIG. 3 is to be determined, it is necessary either to disconnect the auxiliary rectifier 28 or to provide a load for the power supply unit.

Figure 5:
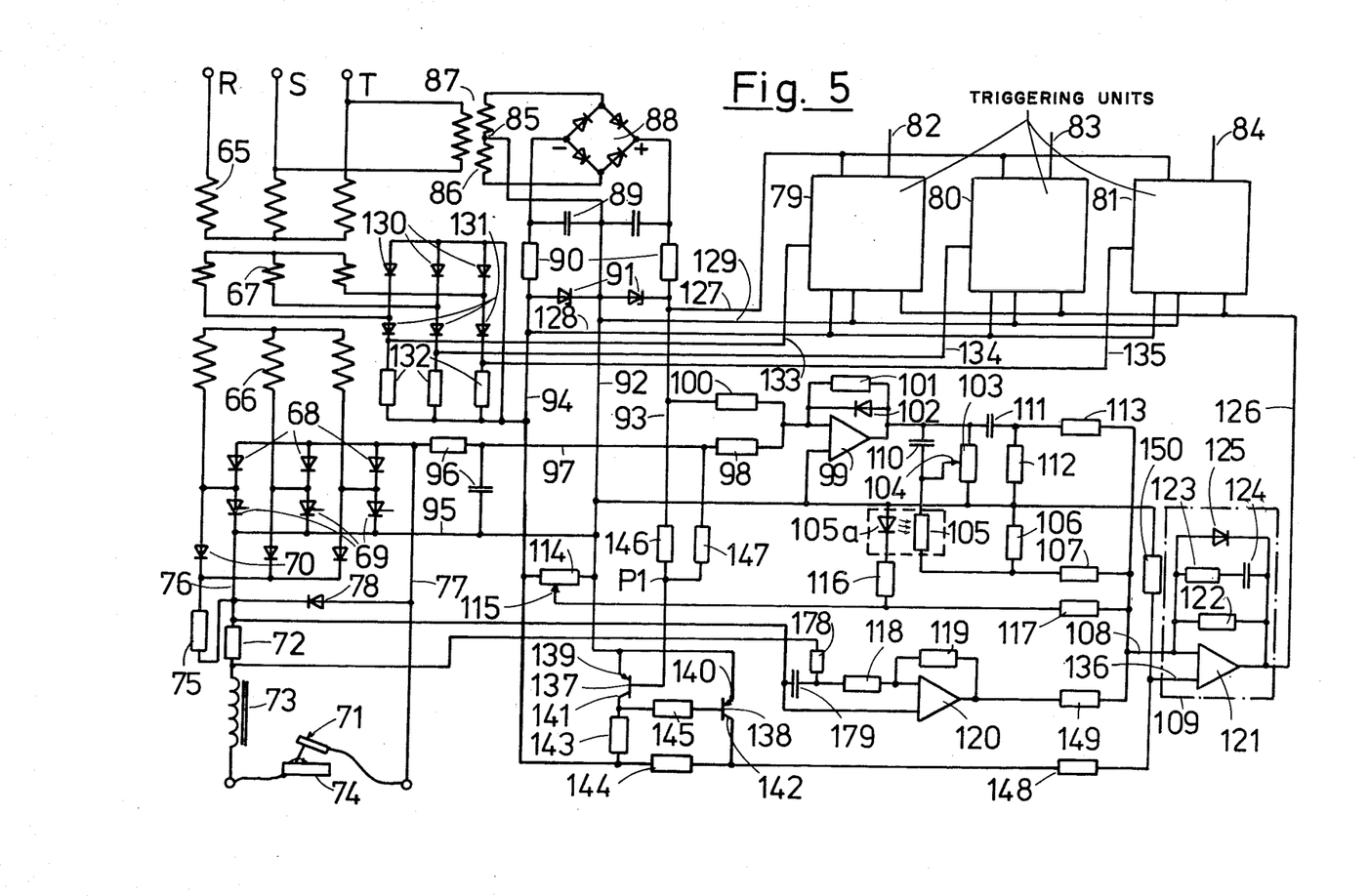
FIG. 5 is a detailed circuit diagram of a preferred embodiment of the invention.

The welding power supply of FIG. 5 has a main transformer comprising a primary 65 and a secondary 66. An auxiliary winding 67 carries no welding power but only supplies a three-phase voltage required for the control system. The secondary is connected to a main rectifier composed of three diodes 68 and three thyristors 69 and is also connected to three diodes 70 constituting together with the diodes 68 an auxiliary rectifier. One output conductor 77 of the rectifier is connected to the welding electrode 71. The other output conductor 76 is connected to the work 74 through a resistor 72 constituting the current sensing means of the control system and a welding inductor 73. The auxiliary rectifier is connected to the welding circuit in series with a current limiting resistor 75. A free-wheel diode 78 is connected between the welding current conductors 76, 77.

Figure 7:
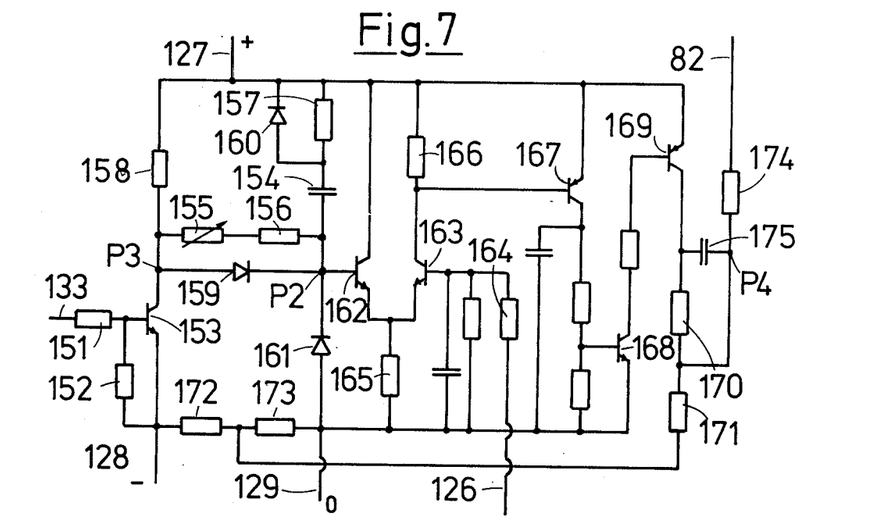
FIG. 7 is a circuit diagram of one of the triggering circuits forming part of the apparatus of FIG. 5, and, FIG. 8a to e are voltage-time diagrams illustrating the mode of working of the triggering circuit of FIG. 7.

The three thyristors 69 are each controlled by a triggering unit 79, 80, 81, each of said triggering units being connected to the control lead of a thyristor 69 through a triggering pulse conductor 82, 83, 84 (a part only of which is represented in the drawing). The circuit diagram of said triggering units is shown in FIG. 7.

The auxiliary operating voltages required for the control system are supplied by a single-phase transformer 87 the secondary 86 of which is provided with a centre tap 85. The secondary voltage is rectifier by a full-wave rectifier 88. The rectified voltage is smoothed by a filter composed of capacitors 89 and resistors 90 and is stabilized by means of a pair of Zener diodes 91 connected in series between the positive operating voltage conductor 93 and the negative operating voltage conductor 94. The junction of the Zener diode is connected to the centre tap 85 and to a zero potential conductor 92.

The positive terminal of the main rectifier is connected to the zero potential conductor 92 through a conductor 95. The voltage of the other terminal of the main rectifier, which is negative with reference to the zero potential conductor 92, is supplied to a conductor 97 through a smoothing R C -filter 96. The conductor 97 is connected to one end of a resistor 98 the other end of which is connected to the input of an operational amplifier 99. Another resistor 100 connects said input to the constant positive voltage of the operating voltage conductor 93. The control voltage supplied to the operational amplifier is, therefore, proportional to a current equal to the quotient of the constant voltage of the conductor 93 divided by the resistance of the resistor 100, reduced by the quotient of the welding voltage of the conductor 97 divided by the resistance of the resistor 98. The operational amplifier 99 is provided with a feed-back circuit comprising a resistor 101 in parallel with a diode 102. At zero input voltage, the operational amplifier has zero output voltage. At positive input voltages, the operational amplifier produces a negative output voltage proportional to the input voltage. At negative input voltages (that is, if the welding voltage derived component of the input voltage is larger than the constant component), the operational amplifier produces zero output voltage, the diode 102 preventing the appearance of a positive output voltage. If K denotes a proportionality constant, $V_s$ the welding voltage and $V_r$ a constant voltage, the operational amplifier produces an output voltage $V_{out} = K(V_s - V_r)$, provided $V_s$ is smaller than $V_r$, and an output voltage $V_{out} = 0$, when $V_s$ is equal to or exceeds $V_r$. Said output voltage is supplied to a potentiometer 103 connected between the output lead of the operational amplifier 99 and the zero potential conductor 92. The tap 104 of said potentiometer is connected to a second potentiometer connected between said tap and the zero potential conductor 92, said second potentiometer consisting of a resistor 105 in series with a resistor 106. The resistor 105 is a light sensitive resistor arranged to be actuated by the light radiation of a photo diode 105a. An increase of the radiation actuating the resistor 105 produces a decrease of the resistance of said resistor. The potentiometers 103 and 105–106 correspond to the potentiometers 48 and 43, respectively, in FIG. 3. The junction of the resistors 105 and 106 is connected to one end of a resistor 107, the other end of which is connected to an input lead 108 of an amplifier device 109 corresponding to the amplifier device 33 of FIG. 3.

A capacitor 110 having a function identical with the one of the capacitor 50 of FIG. 3 is connected between the output lead of the operational amplifier 99 and the potentiometer tap 104. Moreover, a capacitor 111 in series with a resistor 112 is connected between the output lead of the operational amplifier 99 and the zero potential conductor 92, the junction of the elements 111 and 112 being connected to the input lead 108 of the amplifier device 109 through a resistor 113. The function of the circuit comprising said elements is identical with the function of the corresponding circuit 52, 53, 34 of FIG. 3.

A potentiometer 114 is connected between the zero potential conductor 92 and the negative operating voltage conductor 94. The adjustable negative voltage provided by the tap 115 is supplied to the photo diode 105a in series with a resistor 116 and is also supplied to one end of a resistor 117 the other end of which is connected to the input lead 108 of the amplifier device 109.

The small voltage drop caused by the flow of the welding current through the resistor 72 is smoothed by a filter comprising a resistor 178 and a capacitor 179 and connected through a series resistor 118 to the input lead of an operational amplifier 120 provided with a feed-back resistor 119. The output voltage of said amplifier, which is positive with respect to the zero potential conductor 92 and proportional to the welding current, is supplied to one end of a resistor 149 the other end of which is connected to the input lead 108 of the amplifier device 109.

Accordingly, the control voltage supplied to the input lead 108 of the amplifier device 109 comprises the following static components:
 a. A constant, negative component adjustable by means of the potentiometer 114,
 b. a component supplied by the operational amplifier 99 through potentiometers 103 and 105–106, said component being zero as long as the welding voltage exceeds a predetermined value $V_r$ and assuming a negative value proportional to the difference $V_r - V_s$ for welding voltages $V_s$ lower than $V_r$,
 c. a positive component supplied by the operational amplifier 120, said positive component being proportional to the welding current.

The amplifier device 109 comprises an operational amplifier 121 and a feed-back circuit therefor comprising three branches connected in parallel, the first branch containing a resistor 122, the second branch containing a resistor 123 in series with a capacitor 124, and the third branch containing a diode 125 poled so as to block the appearance of negative output voltages. The operational amplifier 121 as well as the other operational amplifiers comprised in the circuit produces an output voltage the polarity of which is opposite to the polarity of the input voltage.

Figure 8:
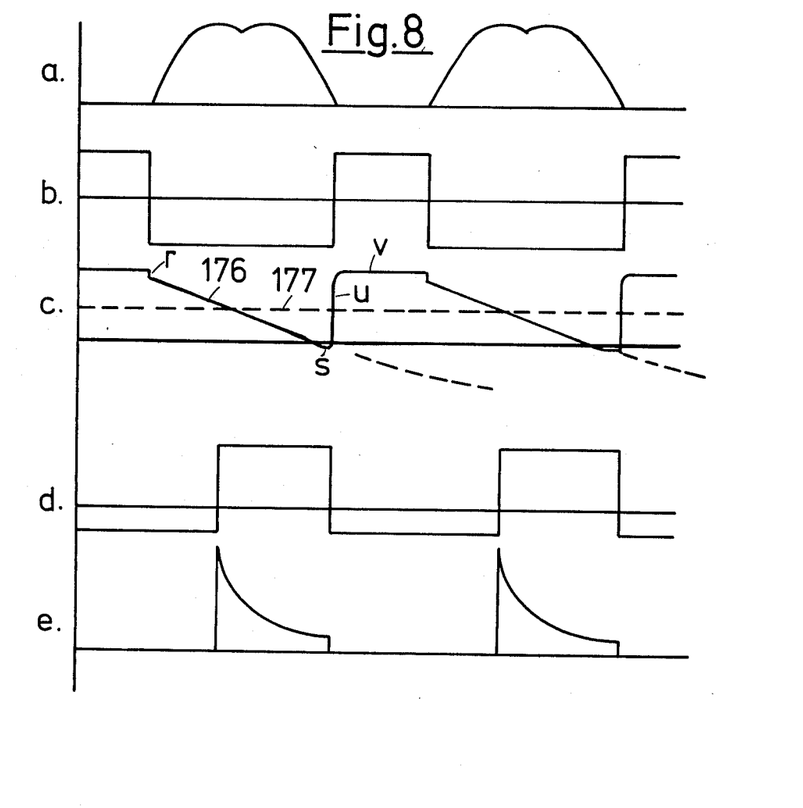

The output signal of the amplifier device 109 is supplied through a conductor 126 to each of the three triggering units 79, 80, 81. The auxiliary voltages required for the operation of the triggering units are supplied to the triggering units by conductors 127, 128 and 129 connected to the operation voltage conductors 93, 94 and the zero potential conductor 92, respectively. Moreover, each of the triggering units is supplied with a pulsating voltage produced by a rectifier device connected to the auxiliary winding 67 of the main transformer, said rectifier device comprising three branches connected in parallel to each other, each of said branches comprising a pair of rectifier valves 130, 131 in series with a resistor 132. The terminals of the auxiliary winding 67 are each connected to the junction between the two rectifier valves in one of the branches. The junction of the three resistors 132 is connected to the negative operating voltage conductor 94. The positive voltage appearing across each of the three resistors is supplied through conductor 133, 134, 135, respectively, to one triggering unit 79, 80, 81, respectively. The circuit arrangements and the function of the triggering unit are described in detail below with reference to FIGS. 7 and 8. It is sufficient to mention here that the angular position of the triggering pulses produced by the triggering units varies in response to the magnitude of the control signal supplied through the conductor 126 in such a way that the thyristors remain in the non-conducting state as long as the control voltage is zero, and that a control voltage above zero maintains the thyristors in the conductive state during a period increasing with the magnitude of the control voltage.

Figure 6:
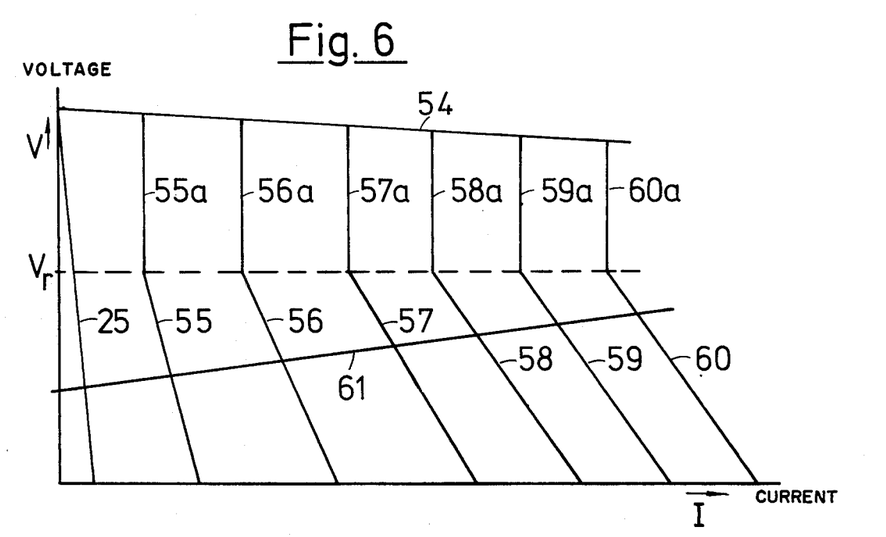
FIGS. 6 and 6a are voltage-current diagrams illustrating the mode of working of the circuit of FIG. 5.

FIG. 6 shows a group of characteristics corresponding to different settings of the potentiometer 114. The reference numerals correspond to those employed in FIG. 4. Each of the control characteristics comprises a sloping portion, for instance 56, corresponding to the sloping characteristic of FIG. 4, but extending up to the voltage $V_r$ only, and a vertical portion of the voltage range between $V_r$ and the maximum voltage determined by the characteristic 54 of the power supply when the thyristors are fully conducting. Said vertical portion is due to the function of the amplifier 99 described above, its output voltage remaining at zero for all welding voltages above $V_r$, whereby in this voltage range the current feed-back only is active. The voltage $V_r$ should preferably have a value within the range of 40 to 50 volts.

The slope of the characteristic should have a certain relation to the current setting; as already explained with reference to FIG. 4, the steepness of the characteristic should be reduced with increased current settings up to a certain current setting, but may be maintained approximately constant in the upper current range (the characteristics 58–60). In the apparatus of FIG. 5, said relation between the steepness of the characteristic and the current setting has been obtained by suitable adjustment of the characteristic of the control unit constituted by the photo diode 105a and the light sensitive resistor 105. More particularly, the properties of said control unit are such that, up to a certain limit, an increase of the voltage supplied by the potentiometer 114 causes a reduction of the resistance of the resistor 105 which, however, remains constant when the voltage is increased above said limit.

With reference to FIG. 4 it was stated that the voltage $V_r$ may be chosen within the arc voltage range. In the system according to FIG. 5 the line $V = V_r$, however, should not intersect the arc characteristic, as the load point should be within the sloping portion of the characteristic. It is possible, however, to make the difference between the arc voltage and the reference voltage $V_r$ as small as desired by providing a reference voltage $V_r$ which varies with the current setting.

Figure 6A:
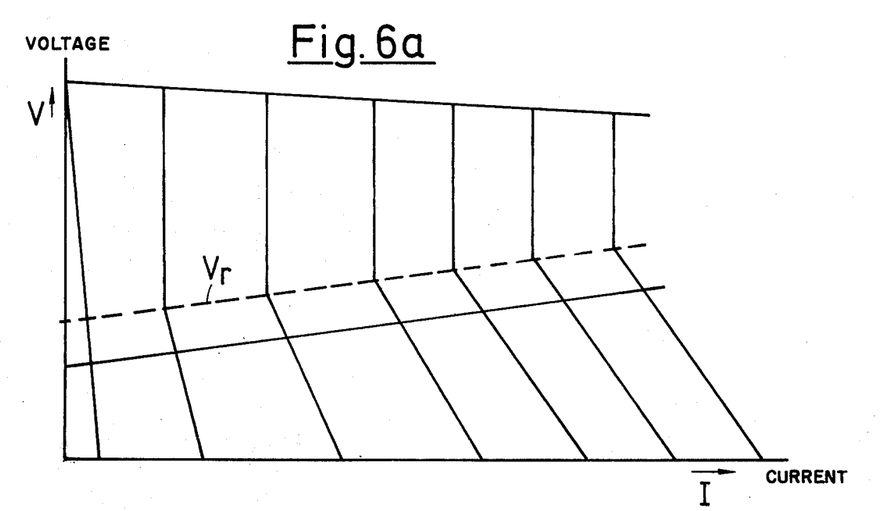

FIG. 6a illustrates this possibility, which can be realized for instance by using a variable resistor 100 and provide a link between its adjusting member and the adjusting member of the potentiometer 114 such that the resistance of the resistor 100 is reduced at increasing potentiometer voltages.

In the previous description of the action of the amplifier device 109 it was assumed that its second input lead 136 has the zero potential defined by the zero potential conductor 92. The apparatus according to FIG. 5 comprises, however, a special circuit supplying a negative bias voltage to the input lead 136 as long as no current flows in the welding circuit. When thus biased, the amplifier device 109 produces no output voltage, so that the thyristors of the welding rectifier are entirely non-conductive. The purpose of this arrangement is to prevent a strong current surge when the welding operation is initiated.

The special circuit referred to comprises two transistors 137, 138. The emitters 139, 140 of the transistors are connected to the zero potential conductor 92, while the collectors 141, 142 are each connected to the negative operation voltage conductor 94 through a resistor 143, 144, respectively. The collector 141 of the transistor 137 is connected with the base of the other transistor 138 through a resistor 145. The base of the transistor 137 is connected to the junction P1 of two resistors 146, 147, one 146 of which is connected to the positive operating voltage conductor 93, while the other resistor 147 is connected to the conductor 97 carrying the smoothed negative output voltage of the welding rectifier. The resistors 146, 147 are so adjusted that the point P1 remains at negative polarity with respect to the zero potential conductor 92 as long as the voltage of the conductor 97 is high (near the no-load value), but assumes positive polarity with respect to the zero potential conductor when the output voltage of the welding rectifier drops below a predetermined value. The collector 142 of the transistor 138 is connected to the input lead 136 of the amplifier 121 through a resistor 148. The input lead 136 is also connected to the zero potential conductor 92 through a resistor 150.

The action of the circuit described is as follows. As long as the conductor 97 is at the no-load voltage, the point P1 is at negative potential, so that the transistor 137 is conducting while the transistor 138 is non-conducting. Under these conditions the input lead 136 receives a negative voltage, more particularly, the fraction of the negative operating voltage determined by the potentiometer arrangement 144, 148, 150. The output voltage of the amplifier device 109 is zero, and the thyristors are non-conductive. When the output voltage of the rectifier drops sufficiently to render the voltage at the point P1 positive, the transistor 137 is rendered non-conducting, while the transistor 138 is rendered conducting and connects the input lead 136 of the amplifier 121 to the zero potential conductor 92 through the resistor 148.

It will be clear from the above description that the auxiliary rectifier constituted by the diodes 70 together with the diodes 68 of the power supply unit according to FIG. 5 has the additional function of maintaining a no-load voltage and supplying the initiating current required to operate the special circuit described. FIG. 7 shows the circuit arrangements of the triggering unit 79 of FIG. 5. The circuit includes the conductor 127 connected to the positive operating voltage conductor 93, the conductor 129 connected to the zero potential conductor 92, the conductor 128 connected to the negative operating voltage conductor 94, the conductor 133 supplying the synchronized voltage pulses appearing across one of the resistors 132, the conductor 126 supplying the control signal produced by the amplifier 109, and the conductor 82 connected to the firing lead in one of the thyristors of the main rectifier.

The direct current pulses transmitted by the conductor 133 are supplied to a potentiometer composed of two resistors 151, 152, the junction of which is connected to the base of a transistor 153, the emitter of which is connected to the negative operating voltage through the conductor 128. The collector of the transistor 153 is connected to the conductor 127 carrying the positive operating voltage through an RC-device comprising a capacitor 154, the charging resistors 155, 156, 157, a discharging resistor 158 and two diodes 159, 160. The resistor 155 is adjusted to provide a desired charging time constant. The junction P2 between the resistor 156, the capacitor 154 and the diode 159 is connected to the base of a transistor 162 and is also connected to the zero potential conductor 129 through a diode 161 poled to allow positive potential only to appear at the point P2. Said diode serves to protect the transistor 162 against overload. The transistor 162 is combined with a second transistor 163 to form a differential amplifier device. The control voltage produced by the operational amplifier 121 (FIG. 5) is supplied to the base of the transistor 163 through the conductor 126 and a resistor 164. The transistors 162, 163 have a common emitter resistor 165. The collector of the transistor 163 is connected to the conductor 127 carrying the positive operating voltage through a resistor 166 and is also directly connected to the base of the transistor 167 the emitter of which is connected to the conductor 127. The transistor 167 constitutes the first stage of a pulse amplifier the second and third stages of which are constituted by the transistors 168 and 169, respectively. A fraction of the negative operating voltage is supplied by a potentiometer arrangement 172, 173 to the collector of the transistor 169 through resistors 171, 170. The conductor 82 connected to the firing lead of one of the thyristors 69 is connected to the collector of the transistor 169 through the series resistors 174 and 170, a capacitor 175 being connected in parallel with the resistor 170.

In FIG. 8, the diagram a represents the voltage pulses supplied by the conductor 133, the diagram b represents the potential of the point P3, the diagram c represents the potential of the point P2 (the full line 176) and the control voltage supplied by the amplifier 121 through the conductor 126 (the dotted line 177), the diagram d represents the potential of the junction point P4 of the resistors 170, 171, and the diagram e represents the triggering pulses transmitted through the conductor 82.

The voltage pulse transmitted by the conductor 133 (FIG. 8a) renders the transistor 153 conducting for the duration of said pulse, whereby the potential of the point P3 is rendered negative (FIG. 8b). A charging current than flows from the positive operating voltage conductor 93 through conductor 127, resistor 157, capacitor 154, resistors 156, 155, the transistor 153 and the conductor 128 to the negative operating voltage conductor 94. The charging of the capacitor 154 produces a drop of the potential of the point P2 (line 176 in FIG. 8c). The sudden voltage drop r at the beginning of the charging period is caused by the potentiometer action of the resistors 155–156 and 157. The charging of the capacitor goes on until the potential of the point P2 has dropped to the zero level. The potential then remains constant (the portion s of the diagram). Termination of the voltage pulse transmitted through the conductor 133 causes the transistor 153 to be stored to the non-conducting state. The capacitor 154 is then discharged throught the resistor 158 in series with the diodes 159, 160. The resistance of the discharge resistor 158 is much smaller than the total resistance of the charging resistors 155, 156, 157. The discharge therefore proceeds quickly (the part u of the diagram). The point P2 as well as the point P3 are now again at the potential of the positive operating voltage conductor (the part v of the diagram).

The transistor 162 is conducting as long as the emitter potential exceeds the emitter potential of the transistor 163, said last-mentioned potential is equal to the control voltage of the conductor 126. As soon as said last-mentioned emitter potential is the larger one, the transistor 163 is rendered conducting and blocks the transistor 162. This occurs at the intersection of the curve 176 and line 177 in FIG. 8c. The resulting pulse is amplified by the three-stage pulse amplifier. When the transistor 169 of the last amplifier stage is rendered conductive, a positive potential is imparted to the point P4 (FIG. 8d). This potential leap causes a current surge through the capacitor 175 and a corresponding pulse through the conductor 82 (FIG. 8e). The triggering current is cut off as soon as the discharge of the capacitor 154 causes the potential at the point P2 to rise to a positive value sufficient to make the emitter potential of the transistor 162 exceed the one of the transistor 163, resulting in restoring the transistor 163 to its non-conducting state. This occurs at the intersection of the charging line u (FIG. 8c) and the line 177. The transistor 169 as well is rendered non-conducting, causing the potential at the point P4 to drop immediately to a negative value (FIG. 8d) determined by the potentiometer 172, 173. The negative bias thus produced prevents spurious firing of the thyristor. No refiring of the thyristor can occur until the next voltage pulse (FIG. 8a) has been supplied by the conductor 133.

The described triggering circuit has the advantage that the triggering angle does not vary with the manufacturing tolerances of the transistors, which may be considerable. The capacity of the capacitor 154 and the resistance of the resistors 155, 156, 157 are the only factors governing the charging of the capacitor 154. Said elements cannot be assumed to be absolutely alike in all of the three triggering units. Adjustment of one element only in each of the triggering units, to wit, the resistor 155, is, however, sufficient to provide identical time constants and consequently identical charging diagrams in all of the three triggering units. The steepness of the charging line 176 is sufficient to provide a sharply defined intersection with the horizontal line 177 representing the control signal sent out by the operational amplifier 121.

In a commercial form of a welding power supply of the type represented in FIG. 5 having a current range of 30 to 400 amperes, the welding current feed-back factor amounts to about 3 volts/ampere. The change of the arc current caused by a line voltage variation of ± 10% is below 1% for current settings above 100 amperes. At current settings below 100 amperes, the arc current change for 10% line voltage variation gradually increases towards a maximum of about 2.5 percent for the lowest current setting (30 amps.).

I claim:
1. A direct current power supply for manual arc welding having a steeply drooping, adjustable volt-ampere characteristic comprising
a polyphase transformer having a plurality of secondary output leads carrying mutually phase displaced voltages, a polyphase rectifier system connecting said secondary output leads to a pair of D. C. welding current conductors, said rectifier system comprising a set of triggered rectifier valves connected one in series with each of said secondary output leads, said triggered rectifier valves having each a trigger terminal for initiating current flow through the valve,
means for periodically supplying igniting pulses to each of said trigger terminals, including means for causing the angular position of said pulses to vary in response to a direct current control signal, and,
means for producing said direct current control signal comprising the following means, to wit,
a. means for producing an adjustable direct current reference signal,
b. means including a welding current sensing means for producing a welding current feed-back direct current signal bearing a substantially fixed proportion to the welding current carried by the pair of welding current conductors,
c. means including a welding voltage sensing means for producing a welding voltage feed-back direct current signal proportional to the welding voltage between said welding current conductors,
d. summing means for combining said reference signal, said welding current feed-back signal and said welding voltage feed-back signal into a compound signal constituting the control signal aforementioned, both of said feed-back signals being supplied to said summing means in opposing relationship to said reference signal, said means for producing a welding voltage feed-back signal including means for adjustment of the slope of the volt-ampere characteristic of the power supply through adjustment of the ratio of said welding voltage feed-back signal to the welding voltage independently of the ratio of the welding current feed-back signal to the welding current.

2. A direct current power supply having a steeply drooping volt-ampere characteristic for manual arc welding comprising a polyphase transformer having a plurality of secondary output leads carrying mutually phase displaced voltages, a polyphase rectifier system connecting said secondary output leads to a pair of D. C. welding current conductors, said rectifier system comprising a set of triggered rectifier valves connected one in series with each of said secondary output leads, said triggered rectifier valves having each a trigger terminal for initiating current flow through the valve, means for periodically supplying igniting pulses to each of said trigger terminals, including means for causing the angular position of said pulses to vary in response to a direct current control signal; and, means for producing said direct current control signal comprising the following means, to wit, a. means for producing an adjustable direct current reference signal, b. means including a welding current sensing means for producing a welding current feed-back direct current signal bearing a substantially fixed proportion to the welding current carried by the pair of welding current conductors, c. means including a welding voltage sensing means for producing a welding voltage feed-back direct current signal proportional to the welding voltage between said pair of welding current conductors, d. summing means for combining said reference signal, said welding current feed-back signal and said welding voltage feed-back signal into a compound signal constituting the control signal aforementioned, both of said feed-back signals acting in opposition to said reference signal in said summing means, said means for producing a welding current feed-back signal, said summing means, said means for controlling the firing angle of the triggered rectifier valves and said rectifier system constituting a welding current feed-back loop arranged to provide a welding current feed-back factor not less than 1.5 volts per ampere, and said means for producing a welding voltage feed-back signal including means for adjustment of the ratio of said welding voltage feed-back signal to the welding voltage independently of the ratio of the welding current feed-back signal to the welding current to provide a selected, steep slope of the volt-ampere characteristic of the power supply.

3. A direct current welding power supply as claimed in claim 2 in which said welding current feed-back loop provides a welding current feed-back factor not less than 2.5 volts per ampere.

* * * * *